May 11, 1965   R. R. CIRCLE   3,183,416
CIRCUIT BREAKER CONTROL SYSTEM
Filed June 5, 1962

WITNESSES

INVENTOR
Robert R. Circle
BY
ATTORNEY

United States Patent Office 3,183,416
Patented May 11, 1965

3,183,416
CIRCUIT BREAKER CONTROL SYSTEM
Robert R. Circle, Elizabeth Township, Allegheny County, Pa., assignor to Westinghouse Electric Corporation, East Pittsburgh, Pa., a corporation of Pennsylvania
Filed June 5, 1962, Ser. No. 200,096
2 Claims. (Cl. 317—148.5)

This invention relates generally, to control systems and, more particularly, to systems for controlling the closing of circuit breakers.

The function of a closing system for a circuit breaker is to cause the breaker to close when a signal is applied. If the breaker opens immediately while the closing signal is still on, the breaker must not be allowed to reclose until the closing signal is removed and reapplied. If the closing signal is applied momentarily and immediately removed the closing operation must be completed. The breaker must close once and only once for each application of the closing signal.

Heretofore, the foregoing function has been performed by a system known as the X-Y relay closing system which has, in general, been satisfactory. However, when the relays are mounted on the breaker mechanism, which is the usual practice, they are subjected to considerable shock when the breaker is operated. The shock causes the relay contacts to bounce, thereby causing erratic closing of the breaker. When it is desired to follow a predetermined close-open cycle components must be utilized which are not sensitive to shock.

An object of the invention is to provide a circuit breaker closing system which is not adversely affected by shock.

Another object of the invention is to provide for utilizing solid state and static components in a circuit breaker control system.

A more general object of the invention is to provide a circuit breaker closing system which shall be simple and efficient in operation and which may be economically manufactured and installed.

Other objects of the invention will be explained hereinafter or will be apparent to those skilled in the art.

In accordance with one embodiment of the invention, an impulse generator which is energized by closing a control switch, produces a signal which is applied to a silicon controlled rectifier to cause the rectifier to become conductive and permit current to flow through the closing coil of a circuit breaker. When the breaker closes an auxiliary switch actuated by the breaker mechanism interrupts the flow of current through the rectifier which stays non-conductive until the control switch is reclosed to cause the pulse generator to apply another pulse to the rectifier, thereby reclosing the breaker.

Figure 1:
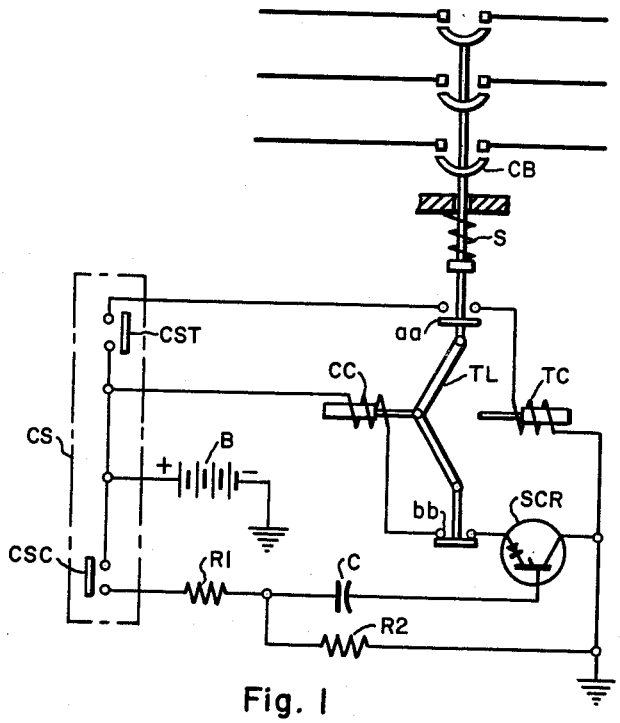
Figure 2:
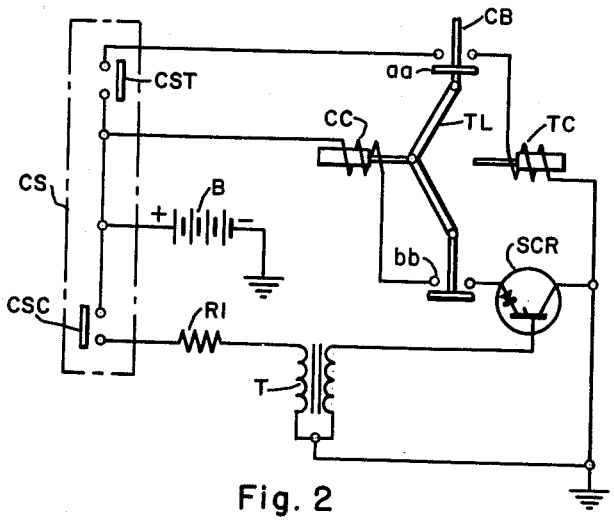

For a better understanding of the nature and objects of the invention, reference may be had to the following detailed description, taken in conjunction with the accompanying drawing, in which:

FIG. 1 is a diagrammatic view of a circuit breaker control system embodying the principal features of the invention; and FIG. 2 is a view, similar to FIG. 1, illustrating a modification of the invention.

Referring to the drawing, and particularly to FIG. 1, the control system shown therein comprises a circuit breaker CB, a control switch CS, a battery B, a semiconductor device SCR, a resistor R1 and an impulse generator comprising a resistor R2 and a capacitor C. The circuit breaker has an operating mechanism comprising a toggle linkage TL, a closing coil CC and a tripping coil TC. As shown, the coils CC and TC energize solenoid mechanisms. However, other well known mechanisms may be utilized to operate the circuit breaker CB. The circuit breaker is biased to the open position by a spring S. When the closing coil CC is energized, the toggle linkage TL is actuated to an overcenter position to close the circuit breaker. When the trip coil TC is energized, the toggle linkage TL is broken from its overcenter position, thereby permitting the spring S to open the contact members of the circuit breaker.

The semiconductor device SCR is preferably a silicon controlled rectifier which is normally non-conducting. When the rectifier is fired by the application of a signal it becomes conductive and remains conductive until the current flowing through the rectifier is reduced to zero. It then remains non-conductive until it is fired or turned on by the application of another signal.

The impulse generator may be a resistance-capacitor circuit as shown in FIG. 1, or it may be a transformer as shown in FIG. 2. The impulse generator may also comprise other devices which will produce an impulse upon the application of a signal.

The control switch CS is of the manually operable type which may be rotated remotely from the circuit breaker. The switch is provided with closing contact members CSC and tripping contact members CST. The control energy is supplied by the battery B. However, it will be understood that other suitable sources of direct current energy may be utilized.

As explained hereinbefore, the function of the closing system is to cause the circuit breaker to close when a signal is applied. If the breaker opens immediately, while the closing signal is still on, the breaker must not be allowed to reclose until the closing signal is removed and reapplied. If the closing signal is applied momentarily and then immediately removed, the breaker must be closed any way. The breaker must close once and only once with each application of the closing signal.

The foregoing requirements are obtained by utilizing the impulse generator and the silicon controlled rectifier herein described. The impulse generator will produce a signal, which quickly dies away, when the generator is energized through the control switch. The pulse produced by the generator is applied to the silicon controlled rectifier, thereby causing it to become conductive. Once the rectifier is turned on, it will conduct until the current is reduced to zero. The rectifier then acts as an open switch until turned on again.

In order to close the circuit breaker, the contact members CSC of the control switch SC are closed. Energy is supplied from the battery B to the contact members CSC and the resistor R1 to the impulse generator. The capacitor C is charged by the voltage produced across the resistor R2. The charging current flowing into the capacitor C, also flows into the gate of the silicon controlled rectifier, thereby causing it to become conductive. As the capacitor becomes charged, the current flowing into the gate of the controlled rectifier SCR gradually decreases, thereby permitting the controlled rectifier SCR to return to the non-conducting state when the current flowing through it and the closing coil CC is interrupted as explained hereinafter. Current then flows from the battery B through the closing coil CC, an auxiliary switch bb on the circuit breaker CB, and the silicon controlled rectifier SCR to ground. The breaker is closed by the solenoid mechanism which is energized by the coil CC. When the breaker closes, the auxiliary switch bb, which is actuated by the breaker mechanism, opens to interrupt the current flowing through the closing coil CC and the rectifier SCR. If the breaker is tripped open by the operation of an overload tripping mechanism (not shown) the rectifier SCR will not conduct until another impulse is applied to the rectifier by the impulse generator. This impulse may be supplied only by reclosing the contact members CSC of the control switch CS. Thus, the breaker will close only once with each application of the closing signal. The control switch CS must be returned to the off position between each closing operation. When a breaker is closed, it may be opened by closing the contact member CST of the switch CS to energize the trip coil TC through auxiliary contact members *aa* which are actuated by the breaker mechanism.

As explained hereinbefore, the impulse generator may be a transformer T as shown in FIGURE 2. When the contact members CSC are closed the transformer T produces an impulse in a manner well known in the art. This impulse is applied to the rectifier SCR to cause the rectifier to become conductive as previously explained. The rectifier permits current to flow through the closing coil CC until the circuit is interrupted by the auxiliary switch *bb*. The rectifier remains non-conductive until another impulse or signal is applied to the rectifier. This can be done only by opening and reclosing the contact members CSC to cause the transformer T to produce another impulse signal.

From the foregoing description, it is apparent that the control system herein described is an improvement over prior systems which utilize relays for controlling the closing of a circuit breaker. The control devices utilized in the present systems are of the solid state or static type which are not adversely affected by shock. Furthermore, the circuitry is simple and the components of the system are reliable in operation and relatively inexpensive.

Since numerous changes may be made in the above described construction and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. A control system comprising a circuit breaker mechanism, a closing coil for the mechanism, a semiconductor device for controlling the energization of the coil, impulse generating means for applying when energized only a single impulse to said device to cause the semiconductor device to become conductive, a control switch for controlling the energization of the impulse generating means, and auxiliary switching means actuated by the breaker mechanism to cause the semiconductor device to become nonconductive, said generating means comprising a source of unidirectional current, a resistance and a transformer having a primary winding connected in series with said switch and said source and a secondary winding connected in circuit relation with said device.

2. A control system comprising a circuit breaker having a closing mechanism, a coil for controlling the operation of the mechanism, a silicon controlled rectifier for controlling the energization of the coil, impulse generating means for applying when energized only a single pulse to fire the rectifier, a control switch for controlling the energization of the generating means, and auxiliary switching means actuated by the closing mechanism for deenergizing the rectifier and the coil, said generating means comprising a source of unidirectional current, a resistance and a transformer having a primary winding connected in series with said switch and said source and a secondary winding connected in circuit relation with said rectifier.

References Cited by the Examiner

UNITED STATES PATENTS 3,045,150  7/62  Mann.
3,116,440  12/63  Baude _____ 317—54

FOREIGN PATENTS 1,235,866  5/60  France.

OTHER REFERENCES

Notes on the Application of the Silicon Controlled Rectifier, General Electric Company, December 1958, pages 36–39.

"Stepper Driver Circuit," RCA Technical Notes, RCA TN No. 503, March 1962.

SAMUEL BERNSTEIN, *Primary Examiner.*

LLOYD McCOLLUM, *Examiner.*